United States Patent [19]
Fujii

[11] Patent Number: 5,673,120
[45] Date of Patent: Sep. 30, 1997

[54] IMAGE OUTPUT DEVICE

[75] Inventor: Shuji Fujii, Tokyo, Japan

[73] Assignee: NEC Corporation, Tokyo, Japan

[21] Appl. No.: 360,941

[22] Filed: Dec. 21, 1994

[30] Foreign Application Priority Data

Dec. 24, 1993 [JP] Japan .................................. 5-347902

[51] Int. Cl.$^6$ ................... H04N 1/40; G09G 1/00; G06F 3/00
[52] U.S. Cl. .................... 358/456; 358/444; 358/453; 358/458; 358/460
[58] Field of Search .................... 358/455, 456, 358/457, 458, 460, 451, 453, 444; 382/237, 298, 299; 345/149; 395/129, 130, 131, 132; H04N 1/40; G09G 1/00; G06F 3/00

[56] References Cited

U.S. PATENT DOCUMENTS

| | | | |
|---|---|---|---|
| 4,528,642 | 7/1985 | Waller | 395/129 |
| 4,703,318 | 10/1987 | Haggerty | 345/149 |
| 5,179,640 | 1/1993 | Duffy | 395/132 |
| 5,347,600 | 9/1994 | Barnsley et al. | 358/433 |

OTHER PUBLICATIONS

Foley et al, "Computer Graphics", Addison–Wesley Pub. Co. (2nd ed, 1990).

Primary Examiner—Thomas L. Stoll
Attorney, Agent, or Firm—Sughrue, Mion, Zinn, Macpeak & Seas

[57] ABSTRACT

An image output device includes a tone pattern generator 33 of an image processing portion 3 which, on the basis of image data representing border positions of a plurality of regions of an image divided according to density values thereof, generates a tone dot pattern corresponding to the density value of the region, a closed region assigning circuit 32 for assigning a closed region on an image memory corresponding to the resolution d of the respective closed region of the image, and a filling out processing circuit 34 writes the tone dot pattern in the assigned closed region as image data having the resolution d.

4 Claims, 7 Drawing Sheets

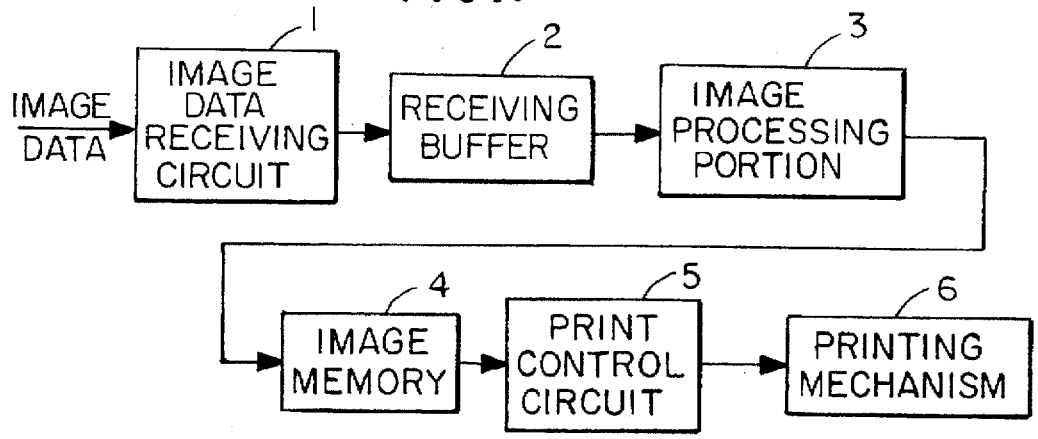
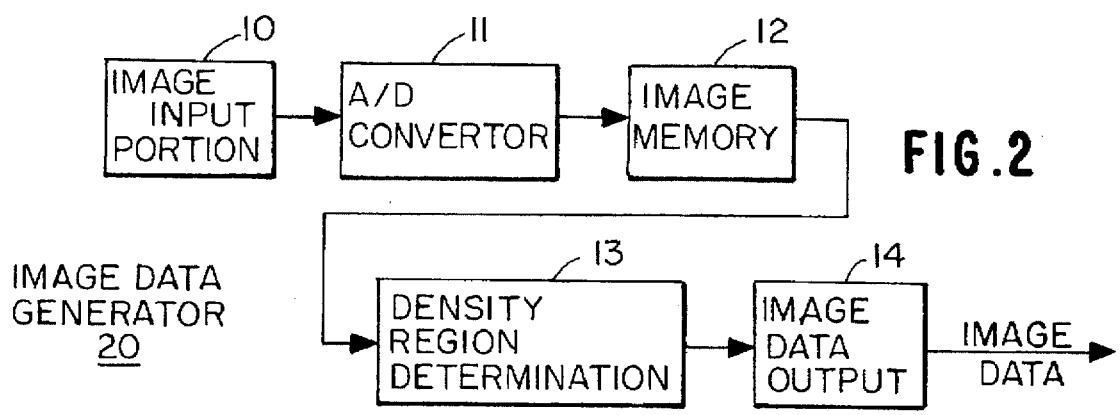
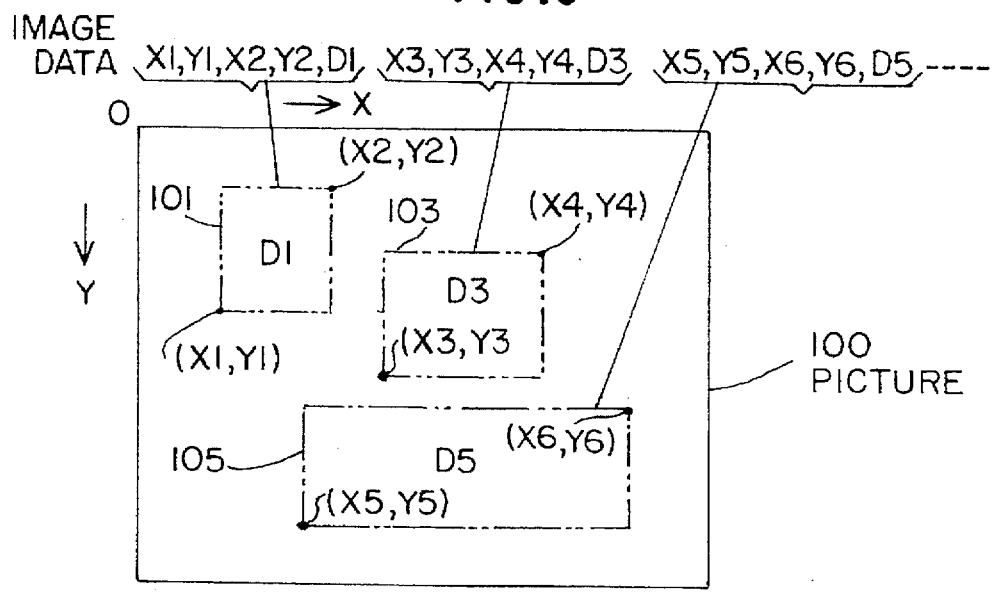

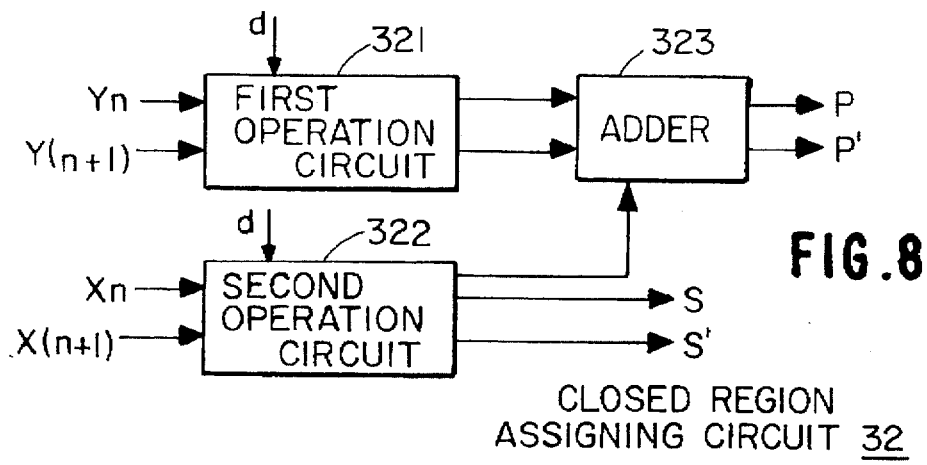
FIG.8
CLOSED REGION ASSIGNING CIRCUIT 32
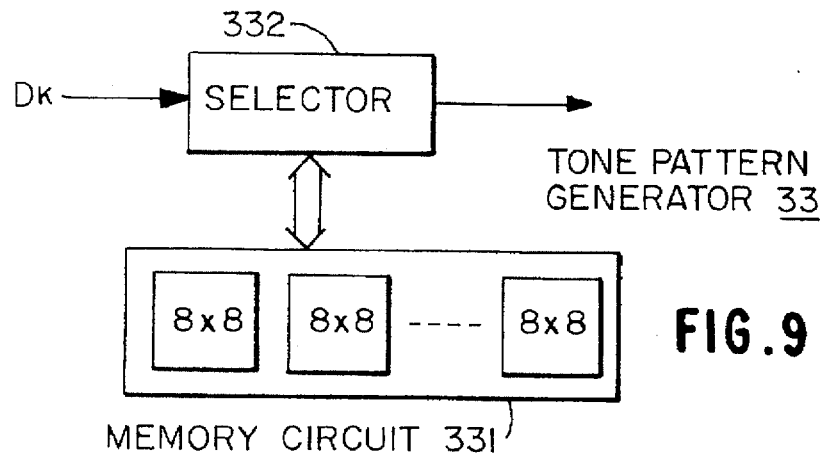
TONE PATTERN GENERATOR 33
FIG.9
MEMORY CIRCUIT 331
FIG.10
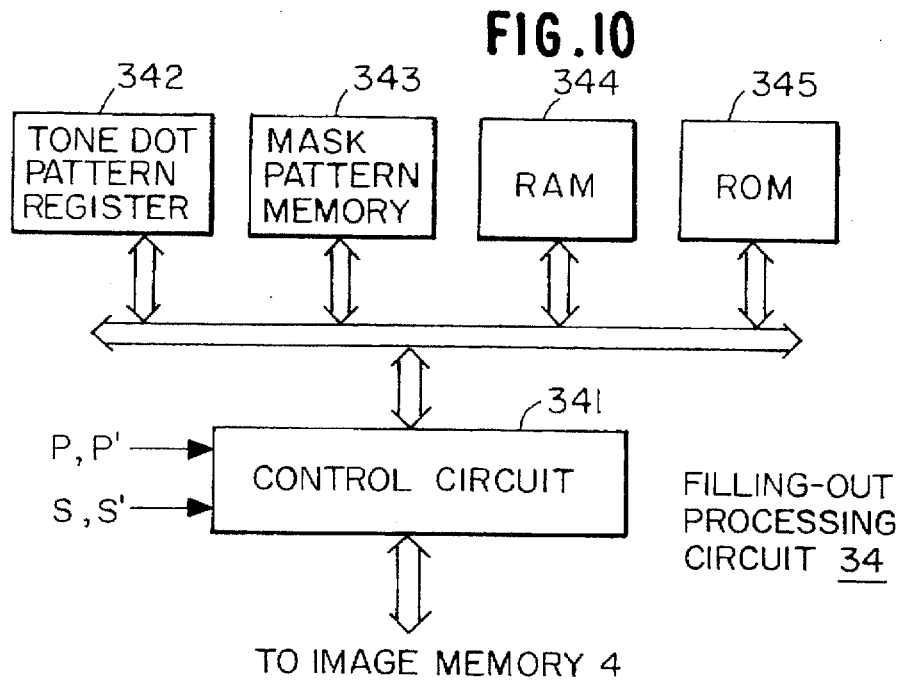
FILLING-OUT PROCESSING CIRCUIT 34
TO IMAGE MEMORY 4

5,673,120

IMAGE OUTPUT DEVICE

BACKGROUND OF THE INVENTION

1. Field of the Invention

The present invention relates to an image output device for displaying or printing digital half-tone image data and, particularly, to an image output device for displaying or printing digital half-tone image data while changing its resolution.

2. Description of the Related Art

A digital half-tone image data transferred from a computer to an image output device has been represented as a monochromatic dot-image. In a case where an image output device such as a printer records or displays a digital half-tone image data, an image data stored in an image memory in the image output device is constructed with a dot pattern matrix whose resolution is coincident with that of the image output device. The dot pattern matrix has black dots and white dots directly corresponding to binary 1 and 0, respectively, as shown in FIG. 15. Alternatively, such image data is represented by black and white runlength data obtained by respectively counting the numbers of successive black and white dots. The image data represented by the dot pattern matrix or the black and white runlength data are stored in the image memory and thereafter displayed or printed.

Since this conventional image data is the dot pattern matrix or runlength data whose resolution is coincident with that of the image output device, there is a problem that an identical digital half-tone image data can not be output to any other image output device having different recording or display resolution.

On the other hand, there is also a device which generates an image data having a resolution different from that of the digital half-tone image data by thinning dots of the half-tone image data or adding dots to the half-tone image data. In this case, however, unless a ratio of resolution of the half-tone image data to that of the image data is an integer, degradation of image quality is unavoidable due to approximate error of density conversion.

SUMMARY OF THE INVENTION

An object of the present invention is to provide an image output device capable of maintaining an image quality substantially constant regardless of difference in image data resolution.

An image output device according to the present invention comprises an image receiving circuit for receiving a first image data including density value data and position data representing a position of an image region having the density value indicated by the density value data, an image processing circuit for converting the received first image data into a second image data, an image memory circuit for storing the second image data from the image processing circuit and an image output circuit for reading out the second image data from the image memory circuit and outputting it. Particularly, the image processing circuit comprises a tone pattern generating circuit for generating a tone dot pattern having colored dots the number of which corresponds to the density value on the basis of the density value data of the first image data. Further, the image processing circuit includes a closed region assigning circuit for assigning a closed region on the image memory circuit on the basis of the position data and a resolution (d), and a filling-out processing circuit for writing the tone dot pattern generated by the tone pattern generator circuit in the closed region as the second image data.

In the image output device according to the present invention, the tone pattern generating circuit of the image processing portion generates the tone dot pattern corresponding to the density values of a plurality of image regions which are divided according to the density values thereof on the basis of the first image data. The closed region assigning circuit assigns closed regions on the image memory circuit according to the resolution (d), and the filling-out processing circuit writes the tone dot pattern in the assigned closed region as an image data of the resolution (d). Therefore, it is possible to print or display the second image data having different resolution from that of the first image data, so that it is possible to reproduce an image of high quality. Further, the reproduced image has no change of quality due to difference in resolution and thus it is possible to maintain constant image quality.

BRIEF DESCRIPTION OF THE DRAWINGS

FIG. 1 is a block diagram showing an image output device according to an embodiment of the present invention;

FIG. 2 is a block diagram showing an image data generator connected to the image output device shown in FIG. 1;

FIG. 3 is a plan view showing a picture pattern;

FIG. 8 is a circuit diagram showing a closed region assigning circuit of the image processing portion shown in FIG. 5;

FIG. 9 is a circuit diagram showing a tone pattern generator circuit of the image processing portion shown in FIG. 5;

FIG. 10 is a circuit diagram showing a filling-out processing circuit of the image processing portion shown in FIG. 5;

DETAILED DESCRIPTION OF THE PREFERRED EMBODIMENT

Figure 4:
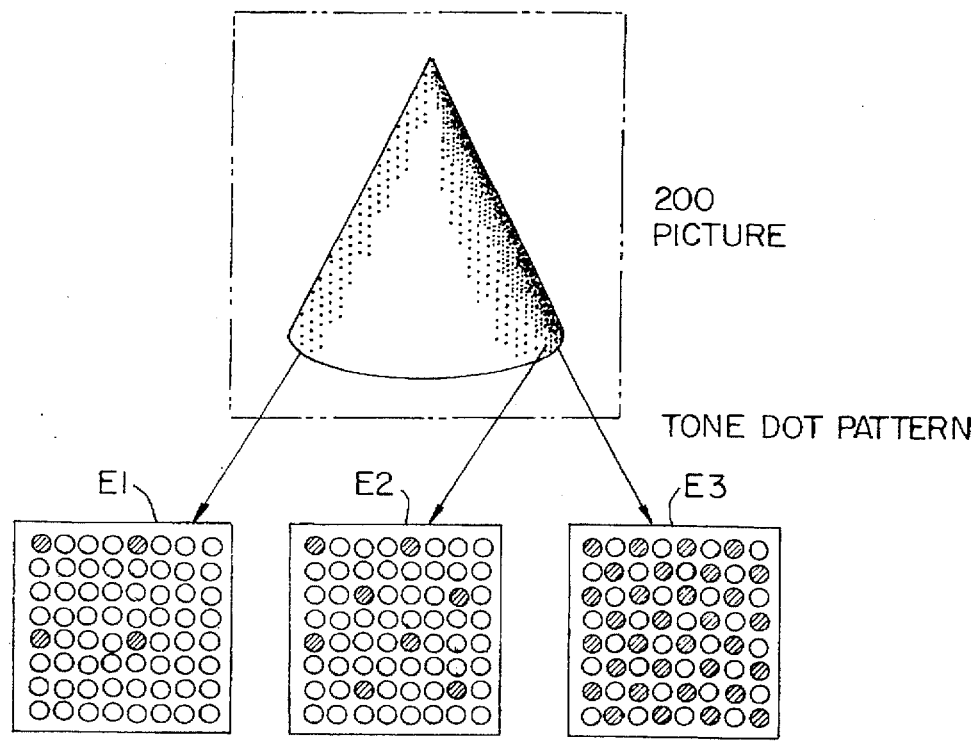
FIG. 4 is a plan view showing an image after being painted out and a tone dot pattern.

An embodiment of the present invention will be described in detail with reference to the drawings.

FIG. 1 is a block diagram showing an image output device according to an embodiment of the present invention and FIG. 2 is a block diagram showing an image data generator connected to the image output device shown in FIG. 1.

The image data generator 20 shown in FIG. 2 divides a picture image into a plurality of rectangular regions according to density values thereof, and generates position data indicating border positions between adjacent rectangular regions of the picture image and density value data indicating the density value of an image within each rectangular region. The position data and the density value data are supplied to the image output device shown in FIG. 1 as image data.

In FIG. 2, an image input portion 10 is constructed with a CCD image sensor which scans an original document to generate an analog image signal representing a density of each pixel of the original document. An A/D converter 11 converts the analog image signal into a digital image signal having 64 tones. An image memory 12 stores the digital image signals of one page. A density region determining portion 13 classifies the digital image signals stored in the image memory 12 every one of 64 tones and divides them to the respective rectangular regions due to the density values. FIG. 3 is a plan view showing an example of the picture image divided by the optical density region determining portion 13. In FIG. 3, the picture 100 is composed of images having density values D1, D3 and D5, respectively. The respective images are divided into rectangular regions 101, 103 and 105.

An image data output portion 14 converts coordinates of the picture 100 and generates the image data indicating border positions of the respective rectangular regions on the coordinate axes and the density values of the respective rectangular regions. An original point of the coordinates is located on an upper left corner of the picture 100 and the border positions of each rectangular region are represented by 2 coordinate data at diagonal points thereof with respect to the original point. That is, the border positions of the rectangular region 101 are represented by coordinates (X1, Y1) and (X2, Y2), those of the rectangular region 103 are represented by coordinates (X3, Y3) and (X4, Y4) and those of the rectangular region 105 are represented by coordinates (X5, Y5) and (X6, Y6). The image data output portion 14 outputs these border positions as the position data. The position data is a physical amount represented by units of inches. On the other hand, each of the density values D1, D3 and D5 is an 8-bit density value data representing any of 64 tones. Alternatively, the density value data may be a coded density percentage.

The image data output portion 14 outputs the position data and density value data of the respective rectangular regions as a series of image data Xn, Yn, X(n+1), Y(n+1), Dk, where n and k are integers, respectively. In this description, Xn and Yn are position data representing coordinates of a lower left position of the rectangular region, X(n+1) and Y(n+1) are position data representing coordinates of an upper right position of the rectangular region and Dk is the optical density data. Alternatively, Xn and Yn may be position data representing coordinates of an upper left position of the rectangular region and X(n+1) and Y(n+1) may be position data representing coordinates of a lower right position of the rectangular region.

In FIG. 1, an image receiving portion 1 receives the image data Xn, Yn, X(n+1), Y(n+1) and Dk from the image data generator 20 (FIG. 2) and transfers it to a receiving buffer memory 2. The receiving buffer memory 2 temporarily stores the image data of a picture pattern of one page at maximum. At image processing portion 3 reads the image data from the receiving buffer memory 2 and generates a tone dot pattern corresponding to the optical density data Dk in the image data. The image processing portion 3 further generates dot image data for filling-out or writing-in a closed region in an image memory 4 by the thus generated tone dot pattern. The closed region is determined by the rectangular region represented by the position data Xn, Yn, X(n+1) and Y(n+1) and a printing resolution d. The number of filling-out dots necessary to fill out the closed region of the image memory is proportioned to a square of the resolution d (dots/inch) of a printing mechanism 6. The tone dot pattern generated in the image processing portion 3 is an 8×8 tone dot matrix as shown in FIG. 4 which depends upon the density value data from the receiving buffer memory 2. In FIG. 4, a picture 200 is represented by using only tone dot patterns E1, E2 and E3. The dot image data stored in the image memory 4 is read out by a printing control circuit 5 and outputted to the printing mechanism 6. The printing mechanism 6 prints the dot image data with the resolution d.

Figure 5:
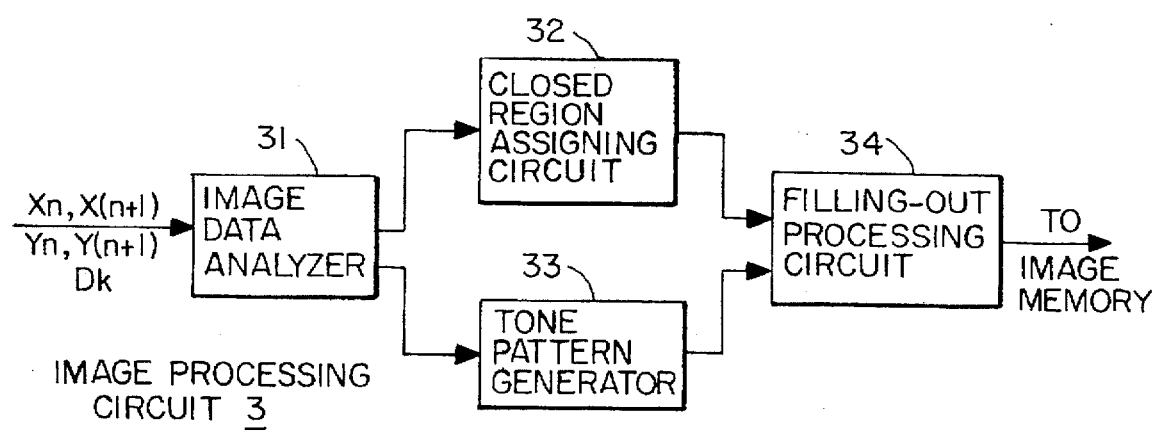
FIG. 5 is a block diagram showing an image processing portion of the image output device shown in FIG. 1.

FIG. 5 shows the circuit diagram of the image processing portion 3. In FIG. 5, an image data analyzer circuit 31 analyzes the image data read out from the buffer memory 2 shown in FIG. 1 and separates it into the position data Xn, Yn, X(n+1) and Y(n+1) and the density value data Dk. A closed region assigning circuit 32 assigns the closed region in the image memory 4 on the basis of the position data Xn, Yn, X(n+1) and Y(n+1) and the resolution d. A tone pattern generator circuit 33 generates the 8×8 tone dot pattern corresponding to the density value data Dk and a filling-out processing circuit 34 fills out the assigned closed region on the image memory with the tone dot pattern from the tone pattern generator circuit 33.

Figure 6:
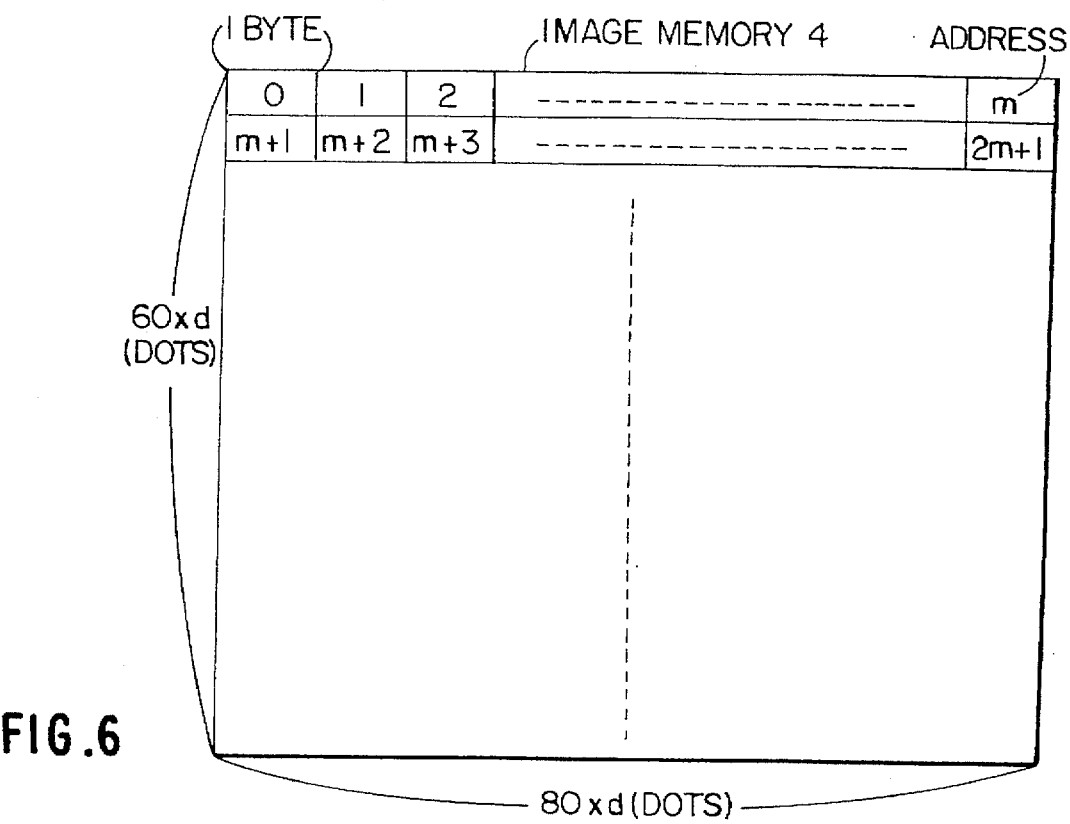
FIG. 6 is a plan view showing a memory map of an image memory of the image output device shown in FIG. 1.
Figure 7:
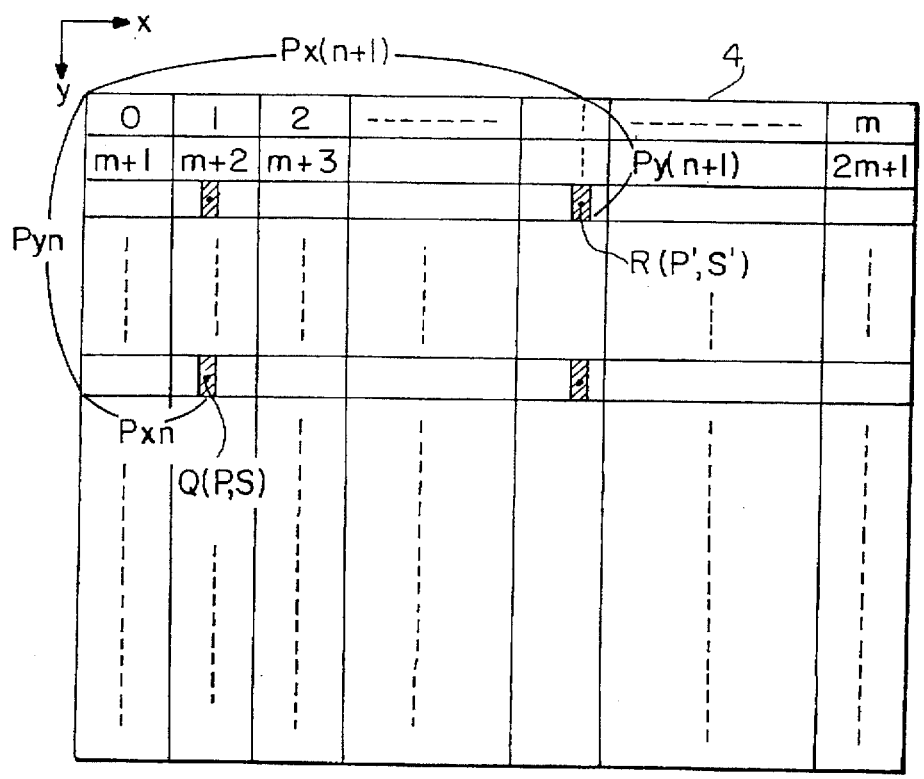
FIG. 7 is a plan view showing positions of bits R and Q on the memory map shown in FIG. 6.

The closed region assigned by the closed region assigning circuit 32 is a rectangular memory region. The assigning method of the closed region will be described with reference to FIGS. 6 and 7. As shown in FIG. 6, the image memory 4 is addressed from address 0 and a data of 1 byte (a 8-dot data) is stored in each address. Assuming that the physical size of the picture image 100 shown in FIG. 3 is 60 (inches)×80 (inches), a size of a memory region of the image memory 4 is 60·d×80·d (bits). So the size is proportional to the square of the resolution d. A rectangular region defined by coordinates represented by the position data Xn, Yn and the position data X(n+1), Y(n+1) is converted by the closed region assigning circuit 32 into a rectangular memory region (closed region) defined in the image memory 4 by bits Q and R as shown in FIG. 7. The closed region assigning circuit 32 generates two sets of address parameters P, P' and S, S' to represent positions of the bits Q and R. Each of the first set of address parameters P and P' is a true address of the byte having the bits Q and R and the second set of address parameters S and S' shows positions of the bits Q and R in the byte. For example, when the bits Q and R are in leftmost positions of the byte, the second set address parameters S and S' are "0", respectively. When the bits Q and R are in a second position and a third position from the leftmost position, respectively, the second set address parameters S and S' are "1" and "2", respectively.

In FIG. 7, when a head bit of the address 0 of the image memory 4 is an original point and the succeeding bits thereof correspond to dots, respectively, x-y dot coordinates (Pxn, Pyn) of the bit Q is defined as follow:

$$Pxn \ (dots) = Xn \ (inches) \cdot d(dots/inch)$$

$$Pyn \ (dots) = Yn \ (inches) \cdot d(dots;inch)$$

Similarly, a x-y dot coordinates (Px(n+1), Py(n+1)) of the bit R is defined as follow:

$$Px(n+1) \ (dots) = X(n+1) \ (inches) \cdot d(dots/inch)$$

$$Py(n+1) \ (dots) = Y(n+1) \ (inches) \cdot d(dots/inch)$$

The image memory 4 has a total of (m+1) addresses in x axis direction and, considering that each address stores 8-dot data, the first address parameters P and P' are calculated by the following equations (1) and (2):

$$P = Y_n \cdot d \cdot (m+1) + ((X_n \cdot d)/8) \quad (1)$$

$$P' = Y(n+1) \cdot d \cdot (m+1) + ((X(n+1) \cdot d/8) \quad (2)$$

In the equations (1) and (2), number below the decimal point is omitted or is rounded to the nearest whole number. The second address parameters S and S' are calculated by the following equations (3) and (4):

$$S = \text{remainder of } (X_n \cdot d)/8 \quad (3)$$

$$S' = \text{remainder of } (X(n+1) \cdot d)/8 \quad (4)$$

FIG. 8 is a circuit diagram of the closed region assigning circuit 32. In FIG. 8, the closed region assigning circuit 32 includes a first operation circuit 321 for calculating $Y_n \cdot d \cdot (m+1)$ and $Y(n+1) \cdot d \cdot (m+1)$ from the position data $Y_n$ and $Y(n+1)$ and the resolution d, a second operation circuit 322 for calculating $(X_n \cdot d)/8$ and $(X(n+1) \cdot d)/8$ from the position data X1 and X2 and the resolution d and outputting results of the calculations, and an adder circuit 323. The second operation circuit 322 outputs remainders of the results of calculations performed by the first operation circuit 321 as the second address parameters S and S'. When the calculation results in the first operation circuit 321 are decimals, the first operation circuit 321 generates an output of integers by rounding the results to the nearest whole numbers, respectively. The adder circuit 323 adds $(Y_n \cdot d \cdot (m+1))$ and $(Y(n+1) \cdot d \cdot (m+1))$ from the first operation circuit 321 to the quotients $(X_n \cdot d/8)$ and $((X(n+1) \cdot d/8)$ from the second operation circuit 322, respectively, and outputs the sums as the first address parameters P and P'. The closed region assigning circuit 32 may be constructed by hardware and the respective address parameters may be calculated by software. The first and second address parameters P and P' and S and S' determine the closed region of the image memory which is to be filled out by the filling-out processing circuit 34 shown in FIG. 5.

FIG. 9 is a circuit diagram showing the tone pattern generator circuit 33. In FIG. 9, the tone pattern generator circuit 33 includes a memory circuit 331 storing a plurality of 8×8 tone dot patterns such as shown in FIG. 4 and a selector circuit 332 selecting one of the tone dot patterns in the memory circuit 331 corresponding to the density value data Dk from the image data analyzer circuit 31 shown in FIG. 5. The memory circuit 331 stores 64 tone dot patterns corresponding to 64 tones in the density. Each tone dot pattern is read out by the selector circuit 332 using the density value data Dk as an address and then output from the selector circuit 332 byte by byte.

FIG. 10 is a circuit diagram of the filling-out processing circuit 34. In FIG. 10, the filling-out processing circuit 34 includes a control circuit 341 having a microcomputer, a tone dot pattern register 342 for storing tone dot patterns from the tone pattern generator circuit 33, a mask pattern memory 343 for storing mask patterns to be used in the filling-out processing, a RAM 344 and a ROM 345 storing a program of filling-out processing. A filling-out method will be described first with reference to FIG. 11.

Figure 11:
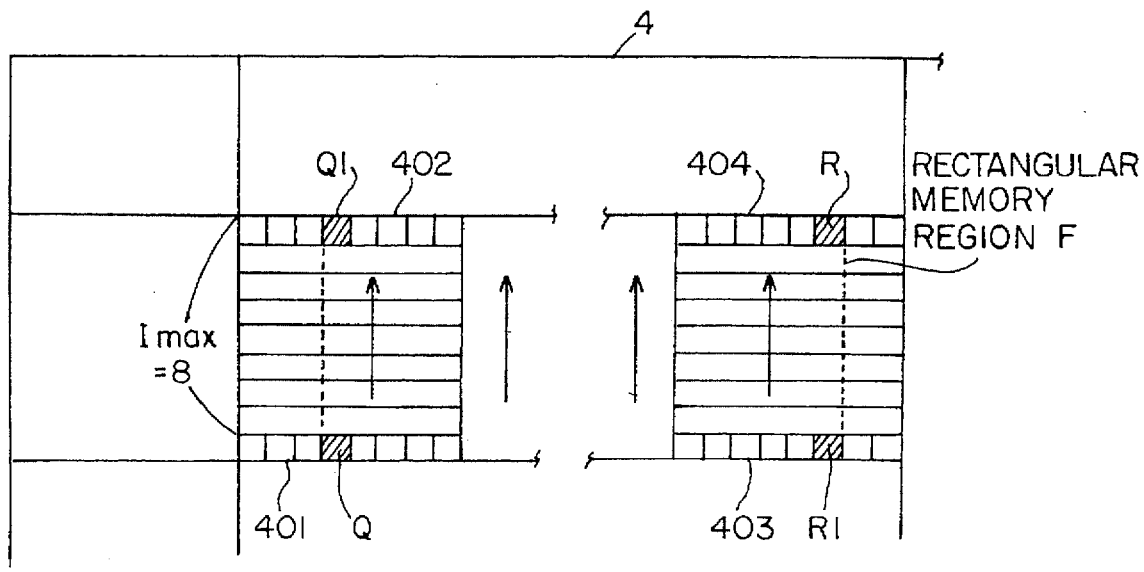
FIG. 11 is a plan view of a portion of the memory map shown in FIG. 7 in an enlarged scale.

FIG. 11 is an enlarged memory map of the image memory around the bits Q and R shown in FIG. 7. The bit Q is within a byte 401 whose address is P (first address pattern) and is located at a fourth bit of the byte from a left end thereof. The bit R is within a byte 404 whose address is P' and is located at a sixth bit of the byte from a left end thereof. The rectangular region defined by the coordinates represented by the position data Xn and Yn and the position data X(n+1) and Y(n+1) shown in FIG. 3 is converted, by using the address parameters P, P' and S, S' from the closed region assigning circuit 32, into a rectangular memory region F surrounded by bits Q, Q1, R, R1 in the image memory 4. The bits Q1 and R1 are at positions of the rectangular memory region F opposite to the positions of the bits Q and R, respectively. An area of the rectangular memory region, that is the number of dots in the area, is proportional to the square of the resolution d. The rectangular memory region F is filled out by the 8×8 tone dot pattern stored in the tone dot pattern register 342. The writing of the tone dot pattern is performed by sequentially assigning addresses from the byte 401 to the byte 404 by means of the control circuit 341. The sequence of address assignment is shown by arrows in FIG. 11. Addresses of the bytes 401 and 404 having the bits Q and R are the first address parameters P and P' supplied from the closed region assigning circuit 32 shown in FIG. 8, respectively. Since the closed region assigning circuit 32 generates the addresses of only the bytes 401 and 404, addresses of other bytes of the rectangular memory region F are generated in the filling-out processing.

Figure 12:
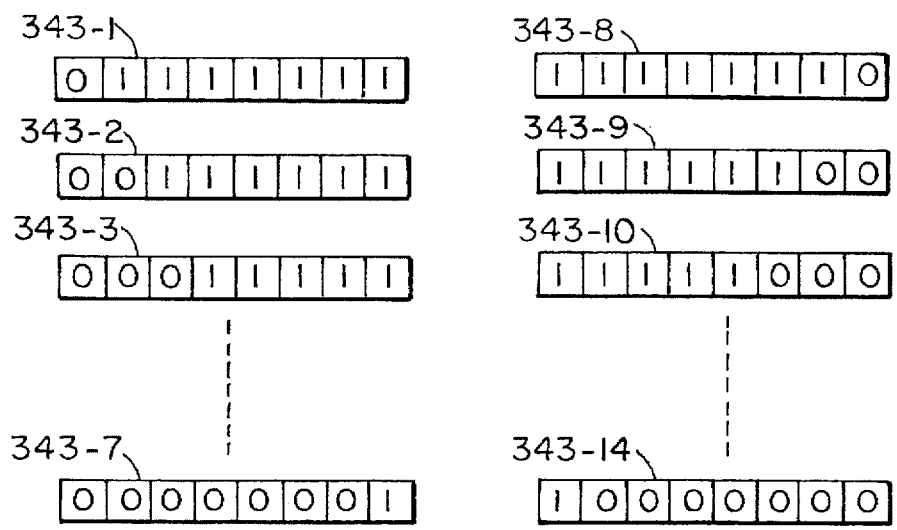
FIG. 12 is a bit map showing a mask pattern used in the painting-out processing.

It should be noted that, when the respective bytes in a row of bytes between the bytes 401 and 402 and a row of bytes between the bytes 403 and 404 are filled out with the 8×8 tone dot pattern stored in the register 342, other portion outside the rectangular memory region F is filled out. As a result, image data already written in the other portion outside the rectangular memory region F is over-written and thus erased. In order to prevent this from occurring, mask patterns each of one byte, which is shown in FIG. 12, are used when the 8×8 tone dot patterns are written in the respective bytes in the row from the byte 401 to the byte 402 and in the row from the byte 403 to the byte 404. The mask patterns 343-1 to 343-14 are stored in the mask pattern memory 343 shown in FIG. 10. The mask patterns 343-1 to 343-7 are written with "0" bits rightwardly from the leftmost bit position with the number of "0" bits in a mask pattern being incremented with respect to the number of "0" bits in a preceding mask pattern. The mask patterns 343-8 to 343-14 are written with "0" bits leftwardly from the rightmost bit position with the number of "0" bits in a mask pattern being incremented with respect to the number of "0" bits in a preceding mask pattern.

When the respective bytes in the row from the byte 401 to the byte 402 are written with the 8×8 tone dot patterns, the control circuit 341 shown in FIG. 10 first selects the mask pattern 343-3 and executes an AND operation between the tone dot pattern and the data "00011111" of the mask pattern 343-3. Then, a resultant AND output is added to the image data already written in the bytes 401 to 402 and a resultant sum of the image data is written in the addresses of the bytes from 401 to 402. On the other hand, when the respective bytes in the row from the byte 403 to the byte 404 are written with the 8×8 tone dot patterns, the control circuit 341 shown in FIG. 10 first selects the mask pattern 343-9 and executes the AND operation between the tone dot pattern and the data "11111100" of the mask pattern 343-9. Then, a resultant AND output is added to the image data already written in the bytes 403 to 404 and a resultant sum of the image data is written in the addresses of the bytes from 403 to 404. With this procedure, the problem of image data erase is solved.

The selection of the mask pattern 343-3 by the control circuit 341 is performed on the basis of the second address parameter S from the closed region assigning circuit 32. The second address parameter S indicates a bit position of the bit Q in the byte 401 and the control circuit 341 selects the mask pattern 343-3 according to the parameter S. On the other hand, the mask pattern 343-9 is selected on the basis of the second address parameter S' from the closed region assigning circuit 32. The second address parameter S' indicates a bit position of the bit R in the byte 404 and the control circuit 341 selects the mask pattern 343-9 according to the parameter S'. In this manner, the control circuit 341 selects one of the mask patterns 343-1 to 343-7 according to the second address parameter S and selects one of the mask patterns 343-3 to 343-14 according to the second address parameter 8'.

The filling-out of other bytes than those in the row from the byte 401 to the byte 402 and the row from the byte 403 to the byte 404 in the rectangular memory region F is performed by merely writing the tone dot pattern in these bytes.

Figure 13:
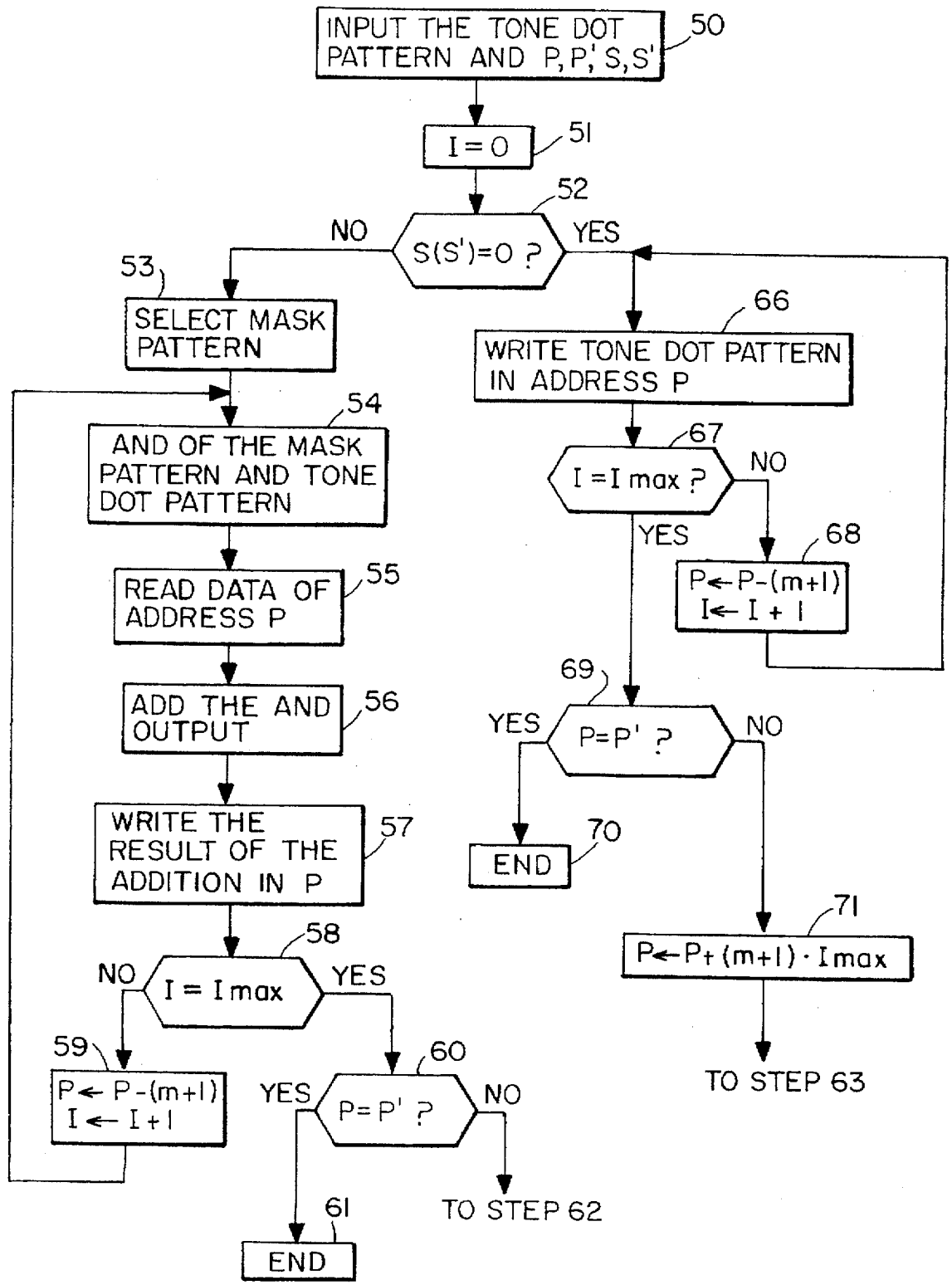
FIG. 13 is a flowchart showing the filling-out process performed by the filling-out processing circuit shown in FIG. 10.
Figure 14:
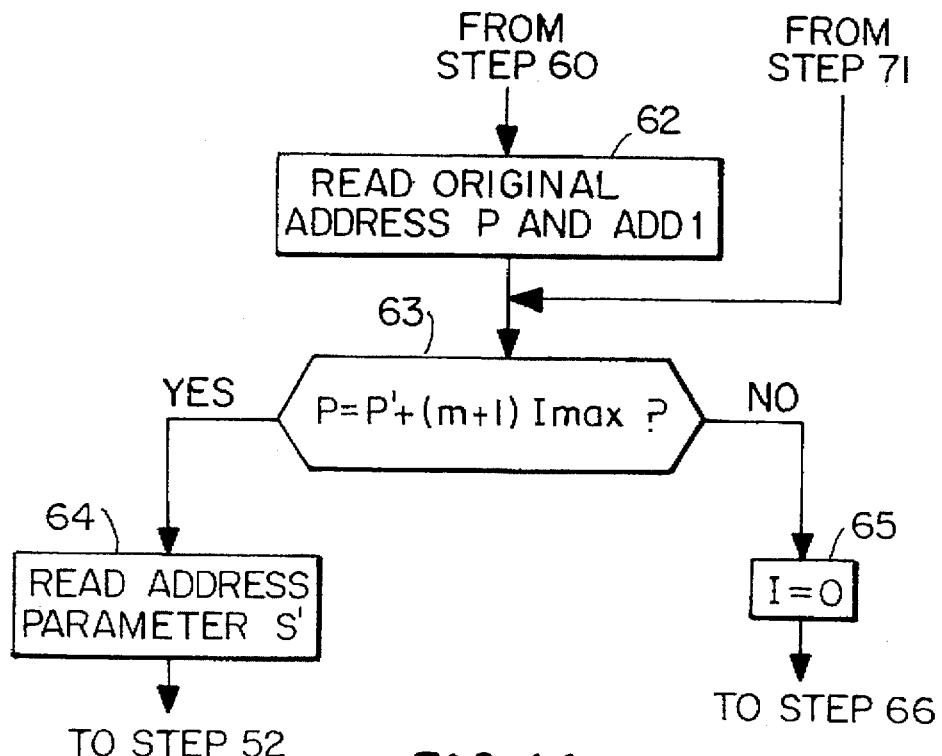
FIG. 14 is a flowchart showing an operation subsequent to the processing shown in FIG. 13.
Figure 15:
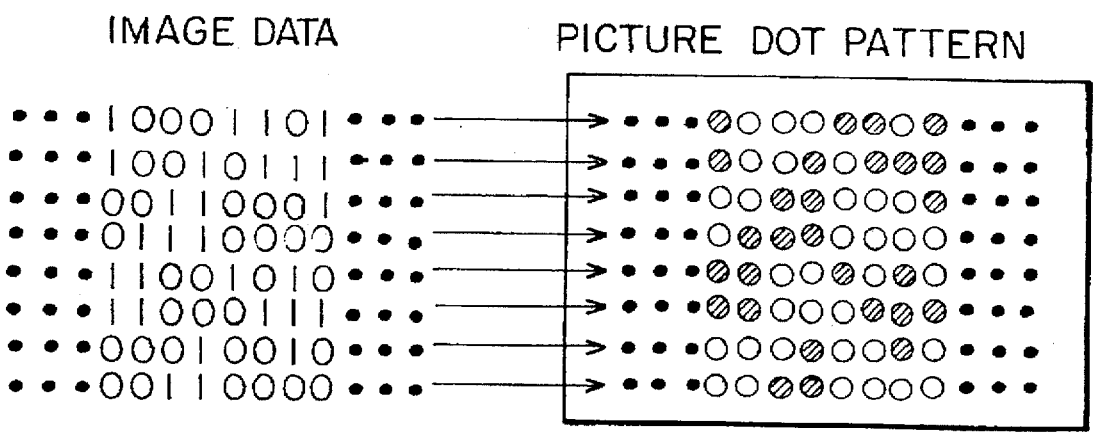
FIG. 15 is a bit map showing conventional image data.

FIGS. 13 and 14 are flowcharts of the filling-out processing by means of the control circuit 341. When the first and second address parameters P, P' and S, S' of the bits Q and R are supplied from the closed region assigning circuit 32, the control circuit 341 stores them in the RAM 344. Further, the control circuit 341 writes the tone dot pattern from the tone pattern generator circuit 33 in the register 342 (step 50). Then, the control circuit 341 sets a parameter I to an initial value 0 (Step 51). The parameter I indicates the number of bytes which are filled out in the filling-out direction (the arrow direction) of the rectangular memory region F shown in FIG. 11. In FIG. 11, the maximum value Imax of I is 8. Imax is obtained by the following equation:

$$Imax = Yn \cdot d - (Y(n+1) \cdot d) - 1$$

The control circuit 341 determines whether the second address parameter S of the bit Q is 0 (Step 52). If S=0, the bit Q in FIG. 11 is in the leftmost bit position in the byte 401. In this case, the control circuit 341 executes the filling-out processing without using the mask patterns shown in FIG. 12 (Step 66). If S is not 0, the control circuit 341 selects a mask pattern from the mask pattern memory 343 on the basis of S (Step 53). In the case shown in FIG. 11, the mask pattern 343-3 is selected in the Step 53. Then, the control circuit 341 reads the lowest positioned byte of the tone dot pattern from the tone dot pattern register 342 and executes the AND operation between the lowest positioned byte and the mask pattern 343-3 selected in the Step 53 (Step 54). Then, the control circuit 341 reads data from the address P (the first address parameter) of the byte 401 shown in FIG. 11 (Step 55). And, the AND output in the Step 54 and the data of the address P are summed (Step 56). This addition is realized by executing an OR operation of them. A result of this addition is written in the address P of the image memory 4 (Step 57). Thus, only the region of the byte 401 in FIG. 11, which overlaps with the rectangular memory region F, is buried with the lowest positioned byte of the tone dot pattern.

Thereafter, in order to determine whether the byte 402 is filled out with the tone dot pattern, the control circuit 341 determines whether the value of the parameter I is Imax (Step 58). Since, in this case, the byte 401 is just buried, an operation for assigning an address of a byte immediately above the byte 401 is executed and the parameter I is incremented by 1 (Step 58). The steps 54 to 59 are repeated until the parameter I becomes Imax and then the processing is shifted to Step 60. At the time of shifting to the Step 60, portions of 9 bytes of the bytes 401 to 402, which overlap with the rectangular memory region F, were filled out by the tone dot pattern. It should be noted that, in the Step 53, the byte of the tone dot pattern read out from the tone dot pattern register is shifted up from the lowest positioned byte every time when the parameter I is changed by the Step 59.

The Step 60 is to determine whether the byte 402 in FIG. 11 is the byte 404 of the bit R. If the bit R is within the byte 402, the processing is terminated (Step 61). In the case shown in FIG. 11, the processing is not terminated and the original address P (address of the byte 401) is incremented (Step 62). At this time point, the address P used till the Step 60 is discharged. The address P obtained in the Step 62 indicates a byte adjacent on right side of the byte 401. Then, the control circuit 341 determines whether the address P is that (=P'+(m+1)·Imax) of the byte 403 (Step 63). Since, in FIG. 11, the address P is still not the address of the byte 403, Steps 65 to 69 are executed. Upon the execution of the Steps 65 to 69, the control circuit 341 causes the tone dot pattern from the register 342 to be written in a row of 9 bytes. If the address P is not that of the byte 404 in which the bit R exists, the address P indicates an address of the lowest row (the row of the byte 401) adjacent on right side (Step 71). It is determined whether the indicated address is that of the byte 403 (Step 63). If the address P is that of the byte 403, the control circuit 341 reads the parameter S' (the second address parameter) from the RAM 344 and the processing is shifted to the Step 52. The control circuit 341 determines whether the parameter S' is 0 and the processing is shifted to the Step 53 or 66 according to the result of the determination.

When the address P which is changed time to time as mentioned becomes coincident with the address p' of the byte 404, the processing is terminated (Step 61 or 70).

As described, the tone pattern generator portion 33 of the image processing portion 3 generates a tone dot pattern corresponding to the density value of the rectangular region on the basis of the image data indicating images of the plurality of rectangular regions partitioned in the picture pattern 100 shown in FIG. 3, the closed region assigning circuit 32 assigns a closed region (rectangular memory region) on the image memory according to the printing resolution d thereof and the filling-out processing circuit 34 writes the tone dot pattern of the assigned closed region as the image data of the printing resolution d. Therefore, it is possible for an identical image data to generate and print or display image data with different resolution from that of the identical image data and thus it is possible to reproduce an image with high image quality. Further, the quality of the reproduced image can be kept constant regardless of difference in resolution.

The present invention is not limited to the embodiments described above. Although, in FIG. 5, the tone dot pattern generated by the tone pattern generator circuit 32 is the 8×8 dot matrix, the size of the dot matrix may be made larger when the number of tones if 64 or more. In the latter case, the number of bits of the density value data Dk becomes larger than 8.

Further, the present invention can be applied to printing or display of a colored .image. When such color image is printed or displayed in RGB, the image data generator may add a color information to the image data. Further, the image output device may includes an image memory for each of R (red), G (green) and B (blue) colors and the filling-out processing circuit 34 shown in FIG. 5 may write image data of these colors in the respective color image memories.

The image output device of the described embodiment may be constructed as follow:

The image output device shown in FIG. 1 is united with the image generator shown in FIG. 2.

The position data Xn, Yn, X(n+1), Y(n+1) are featured by making them indicative of boarder positions of an image region having optical density indicated by the optical density data Dk. The shape of the image region is not limited to rectangular.

The tone pattern generator circuit includes a dot pattern memory circuit storing tone dot patterns having a plurality of tones and a selector circuit for selecting a tone dot pattern from the dot pattern memory circuit according to the optical density data.

The closed region assigning circuit converts the position data into address information of the boarder positions of a closed region on the image memory circuit, and the filling-out processing circuit writes a tone dot pattern in the closed region within the address represented by the address information.

The image memory circuit is addressed every constant number of bits and changes a memory capacity corresponding to resolution d.

The closed region assigning circuit includes a first generator circuit for generating an address in which the boarder positions of a closed region exist and a second generator circuit for generating a parameter indicating a bit of the address in which the boarder position exists. The first and second generator circuits output the address and the parameter to the filling-out processing circuit as the address information of the boarder positions.

The filling-out processing circuit includes means for generating a mask data for masking other region than the closed region according to the parameter from the closed region assigning circuit and means for logically producting the mask data with the tone dot pattern, logically summing the address data and a result of the AND operation and writing the OR output in the address.

As described hereinbefore, in the image output device according to the present invention, the image data representing images of a plurality of regions of a picture pattern is written in an assigned closed region of the image memory by the tone dot pattern corresponding to the density value of that region as an image data having resolution d. Therefore, it is possible for an identical image data to generate and print or display image data with different resolution from that of the identical image data and thus it is possible to reproduce an image with high image quality. Further, the quality of the reproduced image can be kept constant regardless of difference in resolution.

What is claimed is:

1. An image output device comprising:

an image receiving circuit for receiving picture data containing density value data and position data representing border positions of a region having a density value indicated by the density value data;

an image processing circuit for converting received picture data into image data;

an image memory circuit for storing the image data, said image memory circuit being addressed every constant number of bits and changing a memory capacity corresponding to a resolution of the region; and an image output circuit for reading and outputting the image data from said image memory circuit, wherein said image processing circuit comprises:

a tone pattern generating circuit for generating a tone dot pattern having colored dots the number of which corresponds to the density value indicated by the density value data;

a closed region assigning circuit for assigning a closed region on said image memory circuit by address information, said closed region assigning circuit including a first generator circuit corresponding to the position data for generating an address in which the border positions of the closed region exist, and a second generator circuit for generating a parameter indicating a bit in the address in which the border position exists and outputs the address and the parameter as the address information; and a filling-out processing circuit for writing the tone dot pattern generated from said dot pattern generating circuit in the closed region by said address information.

2. The image output device claimed in claim 1, wherein said filling-out processing circuit includes means for generating mask data for masking regions other than the closed region according to the parameter and includes means for logically ANDing the mask data with the tone dot pattern, logically summing the address data and a result of the AND operation and writing the summing result in the address.

3. The image output device claimed in claim 2, further comprising an image data generator for generating said picture data.

4. The image output device claimed in claim 3, said image data generator comprises means for generating an image signal representing a density value of each pixel of an image, means for determining regions corresponding to the density value of the image signal, and means for generating the density value data which represents the density value of the determined region and the position data which represents the border position of the determined region.

* * * * *